A. H. THOMPSON.

COMBINED CHAIR AND DESK OR TABLE.

APPLICATION FILED JAN. 24, 1921.

Reissued Feb. 28, 1922. 15,296.

2 SHEETS—SHEET 1.

Witnesses:
C. E. Sheedy.
B. G. Richards

Inventor:
Archibald H. Thompson
By Joshua R. H. Pope
His Attorney

A. H. THOMPSON.

COMBINED CHAIR AND DESK OR TABLE.

APPLICATION FILED JAN. 24, 1921.

Reissued Feb. 28, 1922. 15,296.

2 SHEETS—SHEET 2.

Witnesses:
E. E. Hueg.
B. G. Richards

Inventor
Archibald H. Thompson
By Joshua R. H. Pope
His Attorney

UNITED STATES PATENT OFFICE.

ARCHIBALD H. THOMPSON, OF SYRACUSE, NEW YORK, ASSIGNOR, BY MESNE ASSIGNMENTS, TO EMPIRE SEATING CO., INC., OF ROCHESTER, NEW YORK, A CORPORATION.

COMBINED CHAIR AND DESK OR TABLE.

15,296. Specification of Reissued Letters Patent. Reissued Feb. 28, 1922.

Original No. 1,293,246, dated February 4, 1919, Serial No. 106,708, filed June 29, 1916. Application for reissue filed January 24, 1921. Serial No. 439,696.

*To all whom it may concern:*

Be it known that I, ARCHIBALD H. THOMPSON, a citizen of the United States, residing at Syracuse, in the county of Onondaga and State of New York, have invented certain new and useful Improvements in Combined Chairs and Desks or Tables, of which the following is a specification.

This invention pertains to an improved combined chair and desk or table, and relates more particularly to that type designed especially for use in school and lecture rooms, though the structure is adaptable for general use wherever a desk is found convenient.

The main object of the invention is to produce a desk wherein the top may be adjusted to any desired position, that is to say, that it may be raised and lowered vertically, that it may be tilted to vary its angular position, and that it may be moved back and forth, either when in an inclined or a horizontal position, closer to or away from the occupant of the chair.

A still further object is to produce a structure which, while firm and rigid, is easy of adjustment and this, with a minimum amount of manipulation and number of parts.

A still further object is to produce a structure which admits of the easy seating and rising of the user of the chair and desk, and likewise affords free foot room or space.

Figure 1:
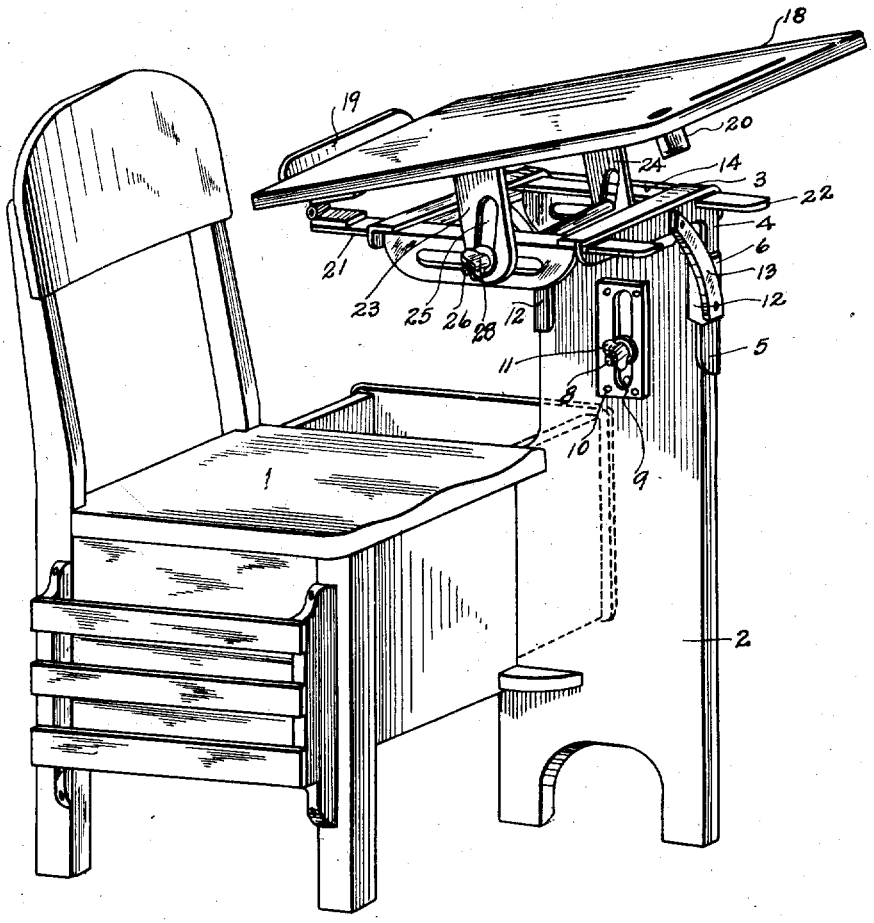
Figure 2:
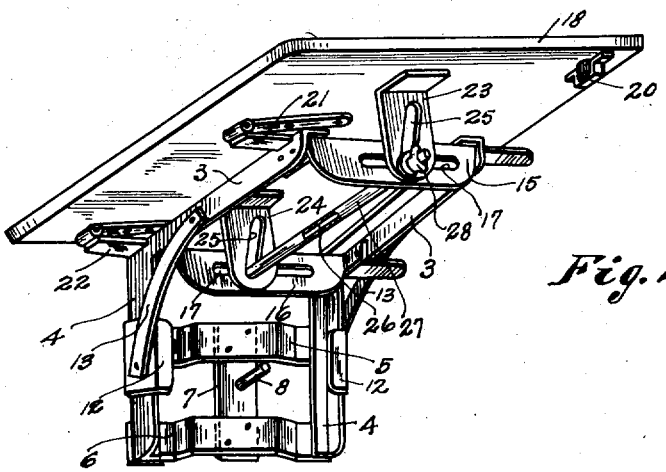
Figure 3:
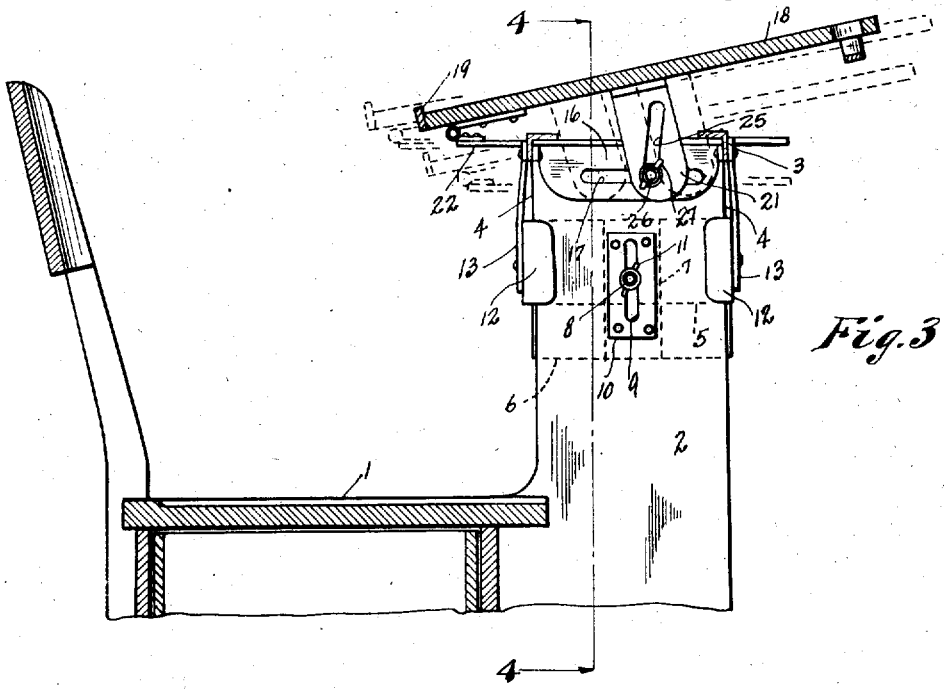
Figure 4:
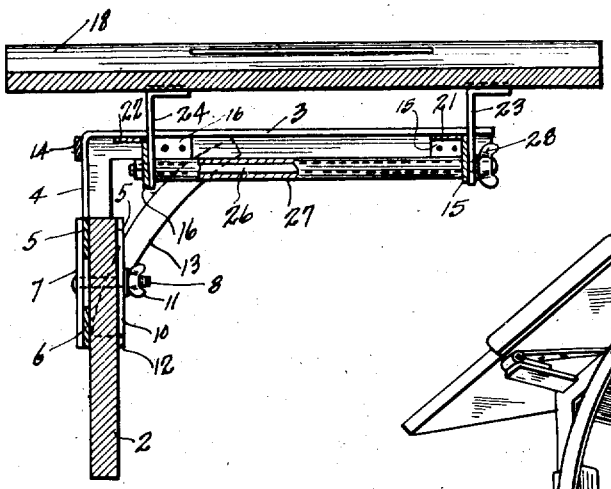

The construction is illustrated in the annexed drawings, wherein:

Figure 1 is a perspective view of the desk and chair;

Fig. 2 a like view of the desk proper and the allied supporting and adjusting parts;

Fig. 3 a longitudinal vertical sectional view of the structure, the desk body being illustrated in several different adjustments in dotted lines, and the lower portion of the structure being broken away or omitted;

Fig. 4 a transverse sectional view, on the line IV—IV of Fig. 3; and

Figure 5:
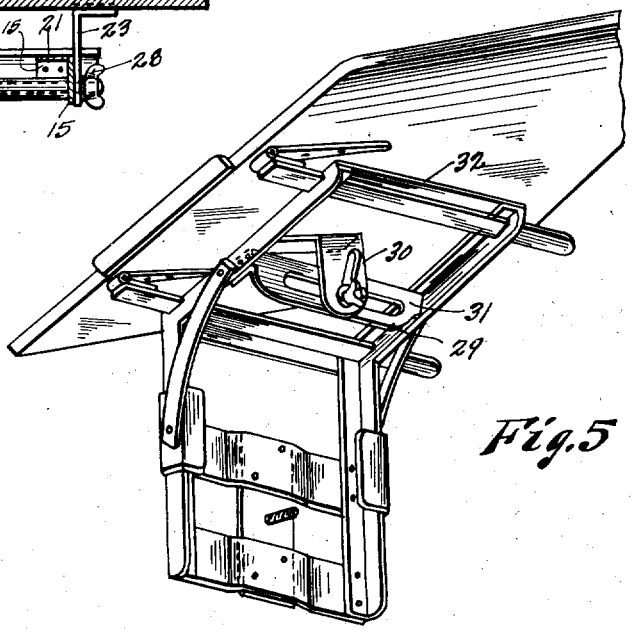

Fig. 5 a perspective view of a slightly different embodiment of the invention.

Referring first to Figs. 1 to 4 inclusive, 1 denotes a chair of any approved type. Extending forwardly therefrom and in line with one side thereof is a vertically-disposed column 2, said member being framed to the chair body and forming in effect one of the legs thereof. Said column is of sufficient width and thickness to form an efficient and stable support for the desk or top, and the adjustable supporting and securing mechanism interposed between the column and desk top.

Surmounting and guided by the column 2 is a vertically-adjustable frame, L-shaped in general outline, and composed of two bracket-shaped members, each having a horizontally-disposed limb 3 and a vertical limb 4. Said bracket members will preferably be made L-shaped in cross-section and spaced apart such distance that the vertical members will bear against the edges of column 2, said members also bearing against the outer face of the column. Secured to said vertical members, adjacent their lower ends, are two cross plates 5 and 6, to which in turn is connected a vertical plate 7, carrying a laterally-extending bolt 8, the plates 5 and 6 being bowed-in slightly in order that plate 7 may be brought into close contact with the adjacent face of the column 2. Said column is pr[illegible]ed with a vertically-disposed, elongated slot or opening 9 through which bolt 8 passes, a wear plate 10 being provided on the inner face of the column and against which the nut 11 on the bolt may bear when the parts are brought to their clamped position.

Inturned guide plates 12, secured to the vertical members 4, may be employed, said plates taking against the inner face of column 2 and serving to guide the bracket-shaped supporting frame when the nut is loosened. Bow-shaped stays or braces 13 will preferably be secured to the vertical and horizontal limbs 3 and 4 and by reason of their curvature they will not be in the way of the occupant of the chair, while at the same time rendering the structure rigid, drooping of the horizontal elements being prevented thereby. A cross-bar 14 may be secured to the upper portions of the vertical elements 4, though this is not essential.

Interposed between and directly riveted to the horizontal limbs 3 are two vertically-disposed plates 15 and 16, each being provided with an elongated slot 17. Said plates, together with plates 5 and 6, and the cross bar 14, firmly and rigidly hold the bracket-shaped members (3 and 4) together and with said bracket members constitute a vertically adjustable supporting frame for the lid. The lid, designated by 18, will preferably be provided with a stop cleat 19, at its inner edge, and may be provided with an ink-well 20.

Hinged to the under side of the lid, adjacent its inner edge, are two slide bars 21 and 22, said bars being arranged at right angles to the limbs 3, 3 and extending through openings formed in the vertical elements thereof. Secured to the under side of the lid are two flat or plate-like posts 23 and 24, said posts lying in contact with the plates 15 and 16, respectively. Each of said plate-like posts will be provided with a slot 25, the slots lying in an arc having as its center the pivot point of the lid to the slide bars 21 and 22. A draw rod 26 passes through slots 17 and 25, and through a spacer and clamping tube 27, the rod carrying at its outer end a wing nut 28. When said nut is loose the lid may be tilted upon the hinge connection between the lid and the slide or guide bars 21 and 22, and may be likewise moved inwardly or outwardly toward and away from the chair by pulling or pushing on the lid, which causes said bars to move through the openings in the limbs or members 3, 3. When brought to the desired position, the lid or top may be secured in place by merely turning up the wing nut 28, which causes the posts 23 and 24 to bind against the plates 15 and 16, and the ends of tube 27 to contact with the adjacent members, in this instance plate 15 and post 24. The above arrangement affords ample range of angular and inward and outward adjustment, and several positions are indicated in Fig. 3. Coupled with the vertical adjustment of the lid, which may readily be effected by loosening nut 11, (permitting raising and lowering of the bracket-shaped lid-supporting frame) the adjustment of the lid may be said to be substantially universal.

In Fig. 5 a slight modification is illustrated. In this instance but a single slotted plate, as 29, is employed instead of two, and the single vertically-disposed slotted post 30 is clamped directly thereto by a short bolt and wing-nut 31. A cross-bar 32 ties the outer ends of the horizontal limbs of the bracket-shaped supporting frame together to render the same rigid.

Under both constructions the lid or top is held firmly in position when once adjusted, and the wing-nuts (or nut, as the case may be) are screwed up.

Having thus described my invention, what I claim is:

1. In combination with a chair, a vertically-disposed column extending upwardly from the forward portion thereof and at one side of the chair; a bracket-shaped supporting frame, the vertical limb whereof is adjustably secured to the upper portion of said column; a lid; a pair of guide bars hingedly connected to the lid, said bars being slidably mounted in horizontally-disposed openings formed in the horizontal members of the frame; and means for securing the lid in its adjusted relation to the supporting frame.

2. In combination with a chair; a vertically-disposed column extending upwardly from the forward portion thereof and to one side of the chair; a bracket-shaped supporting frame, the vertically-disposed limb whereof is adjustably secured to the upper portion of the column; a lid; a pair of guide bars slidably mounted in the horizontally-disposed elements of the supporting frame; a hinge connection between said bars and under portion of the lid adjacent the inner edge thereof; a slotted post extending downwardly from the under side of the lid; a slotted plate rigidly secured to the frame, said post and plate lying adjacent each other; and means for clamping the plate and post together.

3. In combination with a chair; a vertically-disposed column extending upwardly from the forward portion thereof and to one side of the chair; a bracket-shaped supporting frame, the vertically-disposed limb whereof is adjustably secured to the upper portion of the column; a lid; a pair of guide bars slidably mounted in the horizontally-disposed elements of the supporting frame; a hinge connection between said bars and under portion of the lid adjacent the inner edge thereof; a pair of slotted posts extending downwardly from the under side of the lid; a pair of slotted plates rigidly secured to the horizontal portion of the supporting frame, said posts and plates lying side by side, in pairs; a bolt extending through the slots in said members; and a tubular member mounted on said bolt.

4. In combination with a chair; a supporting frame; a lid; a pair of guide bars slidably mounted in the horizontally-disposed elements of the supporting frame; a hinge connection between said bars and the under portion of the lid adjacent the inner edge thereof; a slotted post extending downwardly from the under side of the lid; a slotted plate rigidly secured to the frame, said post and plate lying adjacent each other; and means for clamping the plate and post together.

5. In combination with a chair; a supporting frame; a lid; a pair of guide bars slidably mounted in the horizontally-disposed elements of the supporting frame; a hinge connection between said bars and the under portion of the lid adjacent the inner edge thereof; a pair of slotted posts extending downwardly from the under side of the lid; a pair of slotted plates rigidly secured to the horizontal portion of the supporting frame, said posts and plates lying side by side, in pairs; a bolt extending through the slots in said members; and a tubular member mounted on said bolt.

6. In a device of the character described, the combination with a chair having a standard; of a frame slidably mounted on said standard; means for locking said frame in adjusted position thereon; bearings carried by said frame; rods slidably mounted in said bearings; a top pivotally connected to said rods; and means for holding said top in adjusted position.

7. In combination, a chair seat; a co-operating desk-top support mounted for forward and back adjustments relatively to said seat; a desk-top hingedly mounted for vertical swinging on said support to adjust the inclination thereof; and means for simultaneously locking said desk-top against swinging and said support against forward and back movements.

8. In combination, a chair seat; a co-operating supporting column; a bracket on said column; a support mounted for forward and back adjustments on said bracket; a desk-top hingedly mounted on said support; and means for simultaneously locking said desk-top against swinging on its hinge and said support against forward and back movements on said bracket.

9. In combination with a chair seat; a co-operating supporting column; a bracket on said column; a support mounted for forward and back adjustments on said bracket; a desk-top hingedly mounted for vertical swinging on said support; and means for locking said desk-top to said bracket, said locking means permitting of forward and back and angular adjustments of said desk-top and operating to lock said desk-top to said bracket for simultaneously preventing both movements.

10. In combination, a chair seat; a vertically disposed column extending upwardly from the forward portion of and at one side of said seat; a bracket vertically adjustable upon said column; and a desk top mounted upon said bracket to be moved forward and backward bodily thereon and also hinged to be swung on a horizontal axis into inclined position, the forward and back movement being independent of any pivotal movement, substantially as described.

11. In combination, a chair seat; a vertically disposed column extending upwardly from the forward portion of and at one side of said seat; a bracket vertically slidable upon said column; a desk top mounted upon said bracket to be moved forward and backward bodily thereon and also hinged to be swung on a horizontal axis into inclined position, the forward back movement being independent of any pivotal movement; and means for simultaneously locking said desk top against both forward and back and swinging movements, substantially as described.

In testimony whereof I have signed my name to this specification in the presence of two subscribing witnesses.

ARCHIBALD H. THOMPSON.

Witnesses:
ALFRED McCAULEY,
WILLIAM ZAHN.